United States Patent Office 2,979,714
Patented Apr. 11, 1961

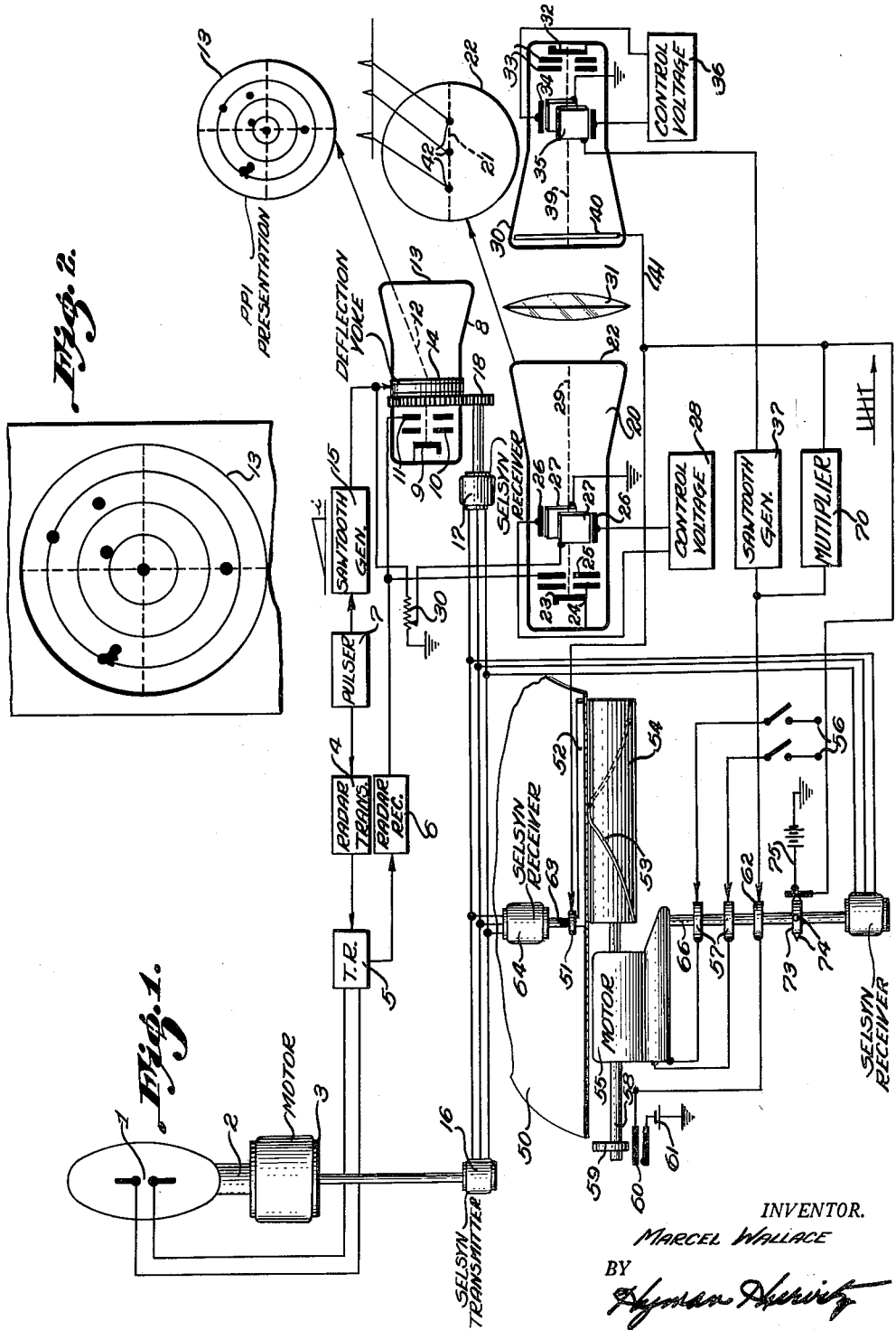

2,979,714
RADAR RECORDERS

Marcel Wallace, East Portchester, Conn., assignor, by direct and mesne assignments, to Panoramic Radio Products, Inc., Mount Vernon, N.Y., a corporation of New York Filed Feb. 19, 1948, Ser. No. 9,370

4 Claims. (Cl. 343—11)

This invention relates generally to recording systems and more particularly to systems for providing recordings of the presentation provided on the face of a cathode ray tube indicator.

More specifically, the present invention relates to systems for transferring to a record receiving surface a permanent and integrated representation of material transiently presented on the face of a cathode ray tube indicator. The latter may comprise the indicator of a radar equipment in one specific application of the invention.

Devices are known in the prior art, and have received wide-spread use, particularly in military applications, for measuring the ranges of remote objects, as well as their bearings, and for presenting a plot of such ranges and bearings on the face of a cathode ray tube indicator. The positions and bearings of remote objects are usually determined by exploring adjacent bearings in succession, transmitting, within successive small increments of bearing, discrete quanta of wave energy, in the form of pulses, and determining the elapsed times of transmission of the energy from a reference position to the remote objects, and back to the reference position after reflection or scattering by the remote objects. Sonic or super-sonic energy may be employed for the purpose, especially to obtain measurements under water. For measurements of ranges and bearings of objects located in the atmosphere it is usual to employ electro-magnetic wave energy, the system employed being then usually designated a radar system. For the purpose of exemplifying the present invention, and not by way of limitation, it will now be explained as applied to a radar system.

Indications of range and bearing are generally obtained by means of the cathode ray tube indicator, which has found extensive use in radar systems as a primary indicator of range, for the reason that the cathode ray beam of such indicators may be deflected at almost limitless velocity. In the usual pulse radar system the beam of the indicator is moved from an initial position, in response to transmission of a pulse of energy from a reference position, at a velocity proportional to the velocity of electro-magnetic radiation, and the beam is modulated in some manner in response to reception of pulses reflected from remote objects, the modulations giving rise to visible indications. By suitably calibrating the path of deflection of the beam, the positions of the visible indications corresponding with modulations of the beam may be interpreted as ranges of the remote objects.

It will be realized that the time of travel of electromagnetic energy over relatively short distances, of the order of 1 to 200 miles, for example, is measurable in terms of micro-seconds and therefore that no mechanical system of range indications which requires that an appreciable mechanical movement keep pace with transmission times of electro-magnetic energy may hope to be successful. The cathode ray tube indicator has, accordingly, reigned supreme in the radar field.

Such indicators have, however, one property, which, while advantageous for some purposes, is fatal for others. Reference is had to the relatively rapid decay time of indications produced on the fluorescent indicating surface of cathode ray tube indicating tubes. By virtue of this property indications are erased shortly after they are created, and the picture presented by the surface is of a relatively transient nature. No possibility exists of obtaining a continuous and permanent record of ranges and bearings, extending over a considerable time period. Where permanent records have been required resort has usually been had to photography of the face of the indicator, involving delays due to the need for developing and fixing films and due also to the difficulties of photographic technique.

The need has long been felt for a suitable system of recording material presented on the face of a cathode ray tube indicator, which shall be substantially instantaneous in its action, and require substantially no attention, and in which the recorded indications shall be visible as soon as they are created. For this purpose the well known facsimile recording technique is well adapted, such technique involving the continuous and repetitive scanning of a record receiving surface by a recording member. Since, however, the scanning recording member is mechanical it is impossible to cause it to effect scanning actions at a sufficiently rapid rate to enable direct comparison with the motion of a pulse of electro-magnetic energy. One mode of approach to the problem of recording radar ranges by means of facsimile techniques is therefore that of deriving the range information from the face of a cathode ray tube indicator by a scanning process, which may be synchronized with the scanning recording process. The scanning velocity of the recorder may thereby be very much smaller than the velocity of electro-magnetic radiation, and may be reduced to a value suitable for movement of mechanical elements.

It is, accordingly, a primary object of the present invention to provide a recording mechanism for recording ranges as measured by a radar system.

It is, more broadly stated, an object of the invention to provide a system of recording measurements accomplished by means of a cathode ray tube indicator.

It is a further object of the invention to provide a system of translating into a permanent record presentations available on the face of a cathode ray tube indicator.

It is another object of the invention to provide a system of transferring plan position indications from the face of a cathode ray tube indicator to a permanent record receiving surface.

The above and still further objects, features and advantages of the present invention will become apparent upon consideration of the following detailed description of one specific embodiment thereof, especially when taken in conjunction with the accompanying drawings, wherein:

Figure 1 is a conventionalized illustration of a pulse radar system and of a recording system associated therewith, arranged in accordance with the invention; and Figure 2 is a plan view of a recording as created in the system.

Turning now to the drawings, the reference numeral 1 denotes a radar antenna, having a relatively narrow transmission-reception pattern in azimuth, and provided with a pedestal 2 and a motor 3 for continuously rotating the antenna 1 and the pedestal 2 at a relatively slow rate, say about 6 r.p.m.

The antenna 1 is coupled in known manner, usually over a rotating joint (not shown) with a U.H.F. radar pulse transmitter 4, via a transmit-receive or T-R switch 5, and also to a radar pulse receiver 6, via the T-R switch 5. The radar transmitter 4 is synchronized by means of a pulser or pulse generator 7, which generates pulse signals of extremely short duration, at a rate of perhaps 1,000 per sec. for keying the transmitter 4.

For any azimuthal attitude of the antenna 1 then, the U.H.F. pulses provided by the radar transmitter 4 are applied to the antenna 1 via the T-R box 5, the latter short circuiting the input circuit of the radar receiver 6 during the transmission to prevent receiver overload, the transmitted pulse travels at a speed of about 300,000,000 meters per second away from the antenna 1, and upon intercepting a target, or remote object, is reflected or scattered. Some of the scattered energy returns to the antenna 1, and is intercepted thereby and applied via T-R box 5, to the receiver 6, the input circuit of which has been opened in response to completion of pulse transmission.

The time elapse between the times of pulse transmission and of pulse reception after reflection, or scattering, is then a measure of the range of the target. To display the value of the time elapse resort is had to a cathode ray tube indicator 8, having a cathode 9, a focusing electrode 10, and an intensifier grid 11, as well as further electrodes (not illustrated) for producing and controlling a beam of electrons 12, the beam ultimately impinging on the face 13 of the cathode ray tube 8, the said face being coated with fluorescent material which glows upon impact by the cathode ray beam 12, and indicates thereby the position of the beam.

Deflection of the beam 12 is accomplished by means of a rotatable magnetic deflection yoke 14, in known manner, the magnetic deflection yoke 14 being supplied with current deriving from a sawtooth current wave generator 15. The latter is synchronized from the pulser 7, the sawtooth current output wave provided by the sawtooth generator 15 commencing its rise in response to each pulse provided by the pulser 7 and having a period determined by the maximum range which is to be measured by the equipment. The character of the deflection yoke is such that the beam 12, in the absence of current in the yoke travels in a straight line, and is undeflected, the beam 12 being deflected radially in proportion to the current in the yoke 14, the polar angle of the deflection being determined by the rotational position of the yoke 14. The rotational position of the yoke 14 is determined by means of a selsyn transmitter 16 and receiver 17, the selsyn transmitter 16 being coupled with the motor 3, so that the position of the antenna 1 is repeated at the selsyn receiver 17, the latter transmitting antenna position to the yoke 14 over gearing 18.

The beam 12 is normally biassed back beyond cut-off, and is driven to indicating intensity by the output of the radar receiver 6, when the latter receives a reflected or scattered pulse from a remote target.

In operation then, the angular relation of the radial traced out by the beam 12 in response to the sawtooth current provided by the generator 14 is maintained in correspondence with the azimuthal attitude of the antenna 1, and hence with the bearing of remote targets with respect to the antenna 1. The radial scan of the beam 12 is itself synchronized with the transmissions from the radar transmitter 4, and the intensifications of the beam in response to output signals provided by the radar receiver 6 accordingly occur at plan positions on the face of the indicator corresponding with plan positions of targets, with the antenna 1 as a central reference point.

The system described in detail in the preceding text is per se conventional in character, and has for that reason been described briefly, and with the minimum of detail consistent with a clear understanding of the system.

To enable reproduction of the presentation provided by the indicating tube 8, signals applied thereto, as well as the radial deflections of the cathode ray beam 12 are reproduced on a further cathode ray tube indicator 20, without regard, however, to the azimuthal bearing of the targets involved, all indications appearing on the same straight line 21 on the face 22 of the indicator tube 20.

The cathode ray indicator tube 20 is provided in conventional fashion with a cathode 23, a focusing electrode 24, an intensifier grid 25, and two sets, 26 and 27, of mutually perpendicular electro-static deflecting electrodes. To the vertical deflection electrodes 26 is supplied potential from a control voltage source 28, which is adjustable to center the trace provided by the beam 29 of the tube 20. One of the horizontal electrodes is grounded, and the other is supplied with deflecting potential derived from a potentiometer 30, through which flows a replica of the current supplied to the magnetic deflecting yoke 14. The intensifier grid 26 is supplied with intensifying signals from the radar receiver 6, which duplicate those applied to the intensifier grid 11 of the cathode ray indicator tube 8.

The trace 21 is, accordingly, at all times synchronized with the radial traces provided by the beam 12 of the tube 8, and duplicates the latter in every respect, except in that the trace 29 is invariable in respect to angle, and provides indications of range only. The trace 21 will, for very short increments of time, of the order of $\frac{1}{10}$ second, be relatively steady and unchanging, since the observed targets will not change radically in this time, but will continually change its character as the antenna 1 rotates, due to the difference in the targets presented for different bearings of the antenna 1. The persistence of the fluorescent screen of the tube 20 must, therefore, be sufficiently high to retain an image for short times, determined by the character of the recorder system used, but must not be higher by any great extent, lest preceding and subsequent traces of different character be apparently superimposed for appreciable intervals of time. The most desirable persistence is determined then by the rate of rotation of the antenna 1, and also by a further, and more important, factor, i.e. the rate at which information is transferred from the screen 22 to the recorder R, hereinafter described, since once information has been transferred it is no longer required on the screen 22 and may preferably be permitted to disappear.

For the purpose of translating information from the screen 22 to the recorder R, I utilize an image scanning tube, such as an iconoscope or image orthicon, or the like, 30. The image 21 on the face 22 of the cathode ray indicator tube 20 is transferred to the face of the image scanning tube 30, over a collimating lens 31. The tube 30 may be supplied with a cathode 32, focusing electrodes 33 and mutually perpendicular sets of deflecting electrodes 34 and 35. The vertical deflecting electrodes 34 are supplied with beam positioning potentials from the control voltage source 36. One of the horizontal deflecting electrodes 35 is grounded, and the other is supplied with saw-tooth generator 37, which may have a frequency more or less arbitrarily selected, of 10 cycles per second, for example, and which may be synchronized in a manner to be described.

Accordingly, the electron scanning beam 39 of the image scanning tube 30 examines the bound electrostatic field on the photo-electric mosaic 40 of the image scanning tube 30, at the rate of ten times per second, providing output pulses in the lead 41 in response to each illuminated target corresponding element 42 on the face 22 of the tube 20. These pulses are conducted by the lead 41 to the recorder R, now to be described and, it will be clear, are spaced in time in a manner representative of range, but with respect to a different time base, i.e. $\frac{1}{10}$ second, than the time base against which range was measured in the indicating tube 20, the latter time base being of the order of 1000 micro-seconds or less.

The recorder R comprises a record receiving surface 50, which remains stationary during the making of a record, i.e. for periods of perhaps five minutes. Thereafter, the recording may be removed, and a clean record receiving surface substituted for receiving a succeeding record. The mechanism for feeding and removing the record receiving surface 50 is not shown, since it forms no part of the invention. However, suitable mechanism for the purpose is disclosed in an application of H. Hurvitz, Serial No. 149,192, filed May 20, 1947, and entitled Radar Azimuth Recorder.

Signals present in the lead 41 are conducted over a brush and slip ring 51 to a knife edge 52 of the recorder R, the knife edge 52 being located above the record receiving surface 50 and co-acting with a helical scanning element 53 to make a mark on the record receiving surface 50 at the point of intersection of the helical scanning element 53 with the knife edge 52, at the instant of occurrence of a marking potential therebetween, i.e. in response to signals in the lead 41.

The helical scanning element 53 is mounted on a cylinder 54, which is rotated by a motor 55, at a convenient rate, say at the rate of 10 r.p.m., power being delivered to the motor 55 from the power line 56, over slip rings 57. The motor 55 is further provided with a shaft extension 58, on which is mounted a switch operating cam 59, for closing a switch 60 once in each revolution of the motor 55, and at a time corresponding with initiation of a scanning cycle of the helical scanning element. Closure of the switch 60 completes a circuit from the potential source 61, over a slip ring 62, to the sawtooth generator 37, synchronizing the operation of the latter, so that the sawtooth generator provides a sawtooth scanning voltage to the image scanning tube 30, which causes the beam 39 of the latter to scan laterally in precise synchronism with the lateral scanning action of the helical electrode 53 across the knife edge 52.

The knife edge 52 is mounted for rotation about one of its end points on a shaft 63 which is driven by a selsyn receiver 64, in response to motion of the selsyn transmitter 16. The motor 55, and the cylinder 54 which is mounted on the shaft thereof, are likewise rotated by means of a shaft 66 driven by the selsyn repeater 67 from the selsyn transmitter 16.

The axes of rotation of the shaft 66 and of the shaft 63 are mutually aligned, and are further in line with one end of the cylinder 54 and with one end of the helical scanning element 53, secured thereto, and are further perpendicular to the axis of rotation of the cylinder 54.

The shafts 63 and 66, further, rotate in precise synchronism with the antenna 1 and with the magnetic deflecting yoke 14, and accordingly the angular position of any record which may be created on the record receiving surface 50 will correspond with the angular position or bearing of a target, the range of which is being measured.

Since the electron beam 39 of the image scanning tube 30 traverses its appointed linear path in precise synchronism with the recording position of the recorder R, i.e. the point of intersection of the knife edge 52 and of the helical element 53, the radial position of each record or mark corresponds with the range of a target. The length axially of the cylinder 54 determines the radius of the ultimate record produced by the system, and this dimension is quite independent of the size of the cathode ray indicator tube 20 or of the scanning tube 30.

It is necessary that the record receiving surface be calibrated in terms of range and azimuth, in order that recordings thereon have readily determined significance. Suitable calibrations may be pre-printed, if desired. This procedure, however, introduces a problem of properly and accurately positioning a record receiving surface with respect to the recorder R for each record which is to be made. It is therefore found preferable to record calibration markings simultaneously with plan-position indications of remote targets.

For the purpose of recording calibration markings, I provide a pulse scaler or multiplier 70 which oscillates at a repetition rate, for example, of 50 pulses per second, and is synchronized from the 10 per second sync pulses generated by the switch 60, which synchronizes the sawtooth generator 37. The output of the multiplier 70 is applied to the lead 41 which carries recording signal, and effects circular traces 71 on the face of the record receiving surface 50, at equal range increments. If the system has a total or maximum range capability of 100 miles, scaling by a factor of 5, as above suggested for purposes of example, will provide range markings at intervals of twenty miles.

A cam 73 having four switch closing projections 74 located at equal intervals of 90° about its periphery is secured to the shaft 66 for rotation thereby, the projections 74 being so located angularly as to create pulses of potential, by closure of an associated switch 75, at times when the antenna 1 is pointing north, south, east and west. Obviously additional projections may be supplied for intermediate bearings, if desired. The pulses referred to are arranged to be at least 1/10 second in duration, i.e. to extend for at least one complete rotation of the cylinder 54, and when applied to the recorder lead 41, via lead 76, effect radial markings on the face of the record receiving surface 50, at angular positions corresponding with N, S, E, and W bearings of the antenna 1.

While I have described and illustrated one particular embodiment of the invention, it will be clear that variations of the arrangement, and especially of its details, may be resorted to without departing from the true scope of the invention as defined in the accompanying drawings.

What I claim and desire to secure by Letters Patent of the United States is:

1. A radar recording system comprising a pulse transmitter for transmitting pulse energy to remote targets, a receiver for receiving that portion of said energy which is returned from said targets, said transmitter and receiver comprising an antenna system for varying continuously over 360° of azimuth the direction of transmittal of said pulse energy, a cathode ray tube indicator having a cathode ray beam and a screen fluorescent in response to impact by said beam, a beam deflecting system for said beam consisting operatively entirely of means responsive to transmission of pulse energy by said pulse transmitter operative to deflect said beam only in the same single and invariable path for all directions of transmittal of said pulse energy, means responsive to reception of energy by said receiver for modulating said beam to create range representative illuminated images on said screen, a further cathode ray tube means comprising a photo-electric mosaic, means for impressing on said mosaic said illuminated images, means for electronically scanning on said mosaic a locus of points, said locus comprising only possible positions of said illuminated images, and for deriving signals spaced in time in accordance with the geometrical spacings of said illuminated images, and a recorder responsive to each of said signals for creating a permanent record of the ranges and bearings of objects giving rise to said images.

2. The combination in accordance with claim 1 wherein said recorder comprises a stationary record receiving surface and a scanning marking element for scanning said surface and creating records thereon, means for synchronizing electronic scanning of said mosaic and the scanning of said record receiving surface, and means responsive to each determination of the location of a range representative image for actuating said recorder to create a permanent mark on said record receiving surface.

3. The combination in accordance with claim 1 wherein said recorder comprises a stationary record receiving surface and a radial scanning marking element for scanning said surface and creating records thereon, means for synchronizing the electronic scanning of said mosaic and the radial scanning of said marking element, and means for relatively angularly displacing said record receiving surface and said marking element to maintain correspondence with said direction of transmittal of said pulse energy.

4. The combination in accordance with claim 1 wherein is provided means for creating a permanent record of arbitrary range and bearing calibration marks on said record receiving surface concurrently with said permanent record of the ranges and bearings of objects.

References Cited in the file of this patent

UNITED STATES PATENTS

| | | |
|---|---|---|
| 2,230,502 | Pearson | Feb. 4, 1941 |
| 2,232,589 | Chappell et al. | Feb. 18, 1941 |
| 2,403,562 | Smith | July 9, 1946 |
| 2,415,981 | Wolff | Feb. 18, 1947 |
| 2,430,283 | Epstein | Nov. 4, 1947 |
| 2,430,307 | Smith | Nov. 4, 1947 |
| 2,467,202 | Gardiner | Apr. 12, 1949 |
| 2,534,820 | Hurvitz | Dec. 19, 1950 |

FOREIGN PATENTS

| | | |
|---|---|---|
| 590,944 | Great Britain | Aug. 1, 1947 |